United States Patent [19]

Ezzell et al.

[11] 4,417,961

[45] Nov. 29, 1983

[54] MEMBRANE CELL BRINE FEED

[75] Inventors: Bobby R. Ezzell, Lake Jackson; Harry S. Burney, Jr., Clute, both of Tex.

[73] Assignee: The Dow Chemical Company, Midland, Mich.

[21] Appl. No.: 248,670

[22] Filed: Mar. 30, 1981

[51] Int. Cl.$^3$ ............................................... C25B 1/34
[52] U.S. Cl. ..................................... 204/98; 204/128; 210/661
[58] Field of Search .................... 204/98, 128, 130; 210/661

[56] References Cited

U.S. PATENT DOCUMENTS

| | | | |
|---|---|---|---|
| 3,793,163 | 2/1974 | Dotson | 204/98 |
| 3,988,223 | 10/1976 | Hirozawa | 204/98 |
| 4,035,254 | 7/1977 | Gritzner | 204/98 |
| 4,108,742 | 8/1978 | Seko et al. | 204/98 |
| 4,115,218 | 9/1978 | Krumpelt | 204/98 |
| 4,202,743 | 5/1980 | Oda et al. | 204/98 |
| 4,204,921 | 5/1980 | Britton et al. | 204/98 |
| 4,236,980 | 12/1980 | Medic et al. | 204/98 |

FOREIGN PATENT DOCUMENTS 55-1352  1/1980  Japan .
56-4495  1/1981  Japan .

OTHER PUBLICATIONS

Seko, Maomi; "The Asahi Chemical Membrane Chlor-Alkali Process"; 2-9-77.
Molnar, Charles J. & Dorio, Martin M.; "Effects of Brine Purity on Chlor-Alkali Membrane Cell Performance"; Oct. 1977.
Pulver, Dale R.; "The Commercial use of Membrane Cells in Chlorine/Caustic Plants"; Feb. 15, 1978.
"Nafion ® Membranes Structured for High Efficiency Chlor-Alkali Cells"; Hora, Charles J.; Oct. 1977.
*The New Encyclopaedia Britannica;* (in 30 vol.), 15th Edition, Macropaedia vol. 16, Encyclopaedia Britannica, Inc., Chicago, copyright 1983.
Lefond, S. J., *Handbook of World Salt Resources,* Plenum Press, New York, 1969.
*McGraw-Hill Encyclopedia of Science and Technology,* McGraw-Hill, Inc., 1977 (last copyright date), vol. 9, p. 347, New York.
Chapter 10 of *Sodium Chloride The Production and Properties of Salt and Brine,* edited by Dale W. Kaufmann, Copyright 1960 by Reinhold Publishing Corporation, New York.

*Primary Examiner*—R. L. Andrews
*Attorney, Agent, or Firm*—M. W. Barrow

[57] ABSTRACT

Method for reducing electrical energy consumption increase of ion-exchange membranes over long term use which comprises electrolyzing an alkali metal chloride solution which contains no more than about 75 ppm "carbonate" whether such low "carbonate" solution is achieved by removing excess carbonate previously added to the solution to reduce the hardness or not.

57 Claims, No Drawings

MEMBRANE CELL BRINE FEED

BACKGROUND OF THE INVENTION

1. Field of the Invention

The present invention relates to an improved operation of electrolytic cells for electrolyzing aqueous alkali metal halide brines in electrolytic cells employing a permselective ion-exchange membrane to separate the anolyte chamber from the catholyte chamber.

2. Definition Used Herein

Herein both "carbon oxide" and "carbonate" are defined to mean: carbon dioxide; or carbonic acid; or a carbonate or a bicarbonate of an alkali metal or an alkaline earth metal (including magnesium); or combinations thereof. These definitions are useful because of the shifting nature of these elements from one to another with shifts in pH of the brine. For example, the carbonate ion shifts to carbon dioxide when the pH is lowered.

3. Discussion of Prior Art

The electrolytic production of chlorine and caustic by the electrolysis of brine has been well known for many years. Historically, diaphragm cells using hydraulically-permeable, asbestos diaphragms which being vacuum-deposited onto foraminous steel cathodes have been widely commercialized. Such diaphragm cells produce NaCl-containing NaOH catholytes, because NaCl passes through the hydraulically-permeable diaphragm from the anolyte to the catholyte. Such NaCl-containing caustic is generally of low caustic concentration and requires a de-salting process and extensive evaporation of water to obtain a low-salt, high concentration caustic for industrial purposes.

In permeable diaphragm-type cells and in mercury-type cells, it has long been known to treat the brine before it is electrolyzed to improve these cells long-term performances. This treatment is done to reduce the hardness cations, and herein is referred to a "conventional" brine treatment. In "conventional" brine treatment sodium carbonate and sodium hydroxide are added to the brine primarily to form calcium carbonate and magnesium hydroxide as insoluble compounds. Most of the solids are then settled and the remainder filtered in this conventional treatment to produce brine having a residual hardness value of only from about 1 to 5 ppm (expressed as ppm calcium). To achieve these low hardness values, an excess of sodium carbonate and caustic are used in the treatment to produce treated brine having a pH of from about 10 to 12 and containing from about 0.4 to 1.5 grams per liter of "carbonate" or "carbon oxide" (expressed as grams/liter of sodium carbonate.)

In any event this conventional brine treatment has not proved sufficient in conjunction with the use of the relatively new permselective cation exchange membranes.

In recent years, the chlor-alkali industry has focused much of its attention on developing membrane cells to produce low-salt or salt-free, high concentration caustic in order to improve quality and avoid the costly desalting and evaporation processes. Membranes have been developed for that purpose which are substantially hydraulically-impermeable, but which will permit hydrated sodium ions to be transported from the anolyte portion to the catholyte portions of the electrolysis cell, while substantially preventing transport of chloride ions. Representative of such membranes are the perfluorosulfonic acid membranes made and sold by the E. I. duPont de Nemours & Co., Inc., under the tradename, Nafion, and the perfluorocarboxylic acid membranes of the Asahi Glass Industry Co., Ltd., of Tokyo, Japan. See U.S. Pat. No. 4,065,366 to Oda et al for a description of the latter carboxylic acid type membranes.

Such membrane-type cells are operated by flowing a brine solution into the anolyte portion and by providing salt-free water to the catholyte portion to serve as the caustic medium during electrolysis. The anodic reactions and cathodic reactions are the same regardless of whether a membrane cell or a diaphragm cell is employed.

It is known that, with the passage of time, the operating voltage of such membrane type cells gradually increases. Of course, this increasing voltage has meant an increase in electric power used by the cells. Eventually the electrical energy consumed by the cell per unit of product produced rises to the point of being so costly that the cells have to be shut down and the membranes washed or replaced. This, of course, is very expensive, and, hence, means have been sought to slow down, if not, stop this rise of cell voltage and electric energy consumption, so as to extend the useful life of these expensive membranes, to lengthen the time between expensive cell shutdowns, and to operate the cells at reduced energy consumption.

Polyvalent cations remaining in the brine cell feed even after conventional treatment have been identified by the prior art as being the principal source of these problems; particularly the polyvalent cations often referred to as the "hardness"; e.g., the calcium and magnesium cations ($Ca^{++}$ and $Mg^{++}$), present in the brine feed.[1]

[1] See U.S. Pat. No. 3,793,163 to R. S. Dotson (1974); *The Asahi Chemical Membrane Chlor-Alkali Process*, page 5 of a paper presented by Maomi Seko of Asahi Chemical Industry Co., Ltd., of Tokyo, Japan, at The Chlorine Institute, Inc., 20th Chlorine Managers Seminar, at New Orleans, Louisiana on Feb. 3, 1977; *Effect of Brine Purity on Chlor-Alkali Membrane Cell Performance*, a paper originally presented by Charles J. Molnar of E. I. duPont de Nemours & Co., Inc., and Martin M Dorio of Diamond Shamrock Corporation at The Electrochemical Society Fall Meeting held October, 1977, at Atlanta, Georgia; *The Commerical Use of Membrane Cells in Chlorine/Caustic Plants*, pages 6–9 of a paper presented by Dale R. Pulver of Diamond Shamrock Corporation at The Chlorine Institute's 21st Plant Manager's Seminar, at Houston, Texas, on Feb. 15, 1978; *Nafion ® Membranes Structured for High Efficiency Chlor-Alkali Cells*, a paper presented by Charles J. Hora of Diamond Shamrock Corporation and Daniel E. Maloney of E. I. duPont de Nemours & Co., Inc., at The Electrochemical Society Fall Meeting, October, 1977, Atlanta, Georgia; U.S. Pat. No. 4,115,218 to Michael Krumpeit (1978); U.S. Pat. No. 4,073,706 to Zoltan Nagy (1978); U.S. Pat. No. 3,988,223 to S. T. Hirozawa (1976); U.S. Pat. No. 4,204,921 to W. E. Britton et al (1980); U.S. Pat. No. 4,202,743 to Oda et al (1980); and U.S. Pat. No. 4,108,742 to Seko et al (1978).

As indicated above, it is well known that multivalent cations such as calcium, magnesium, iron and aluminum form insoluble precipitates in and on the membrane causing an escalation of cell voltage and in extreme cases, a decrease in cell current efficiency. Thus, Hora and Maloney (*Nafion ® Membranes Structured for High Efficiency Chlor-Alkali Cells*, The Electrochemical Society Fall Meeting, October 1977, Altanta, Georgia) report that the use of pure brine is especially important when operating any membrane cell. The use of ion exchange treatment of the brine feed results in hardness levels less than one ppm.

Molnar and Dorio (*Effects of Brine Purity on Chlor-Alkali Membrane Cell Performance*, same meeting as above) studied the specific effects of Ca and Mg on chlor-alkali membrane cell performance. In this paper, twenty ppm of Ca added to the brine resulted in an immediate decrease in current efficiency and increase in cell voltage. The same level of Mg resulted in a decrease in current efficiency, but it caused little if any effect on voltage over a short period (20 days). Addition of only 6 ppm Ca, when using a membrane having sulfonamide functional groups, resulted in an immediate descrease in current efficiency and increase in voltage.

Seko (in a paper presented at The Asahi Chemical Membrane Chlor-Alkali Process, The Chlorine Institute, 20th Chlorine Plant Managers Seminar, New Orleans, Louisiana, February 1977) reported that, while using membranes having carboxylic acid functional groups, it is most important to purify the brine to maintain as low a level as possible of multivalent cations. To accomplish this, conventionally treated brine was further purified by ion exchange treatment. Further treatment of this conventionally treated brine with chelating type ion-exchange resins to remove more hardness has no effect on the carbonate and caustic level. When the brine is fed to chlor-alkali cells, the carbonate, in the acid conditions of the anolyte compartment, forms carbon dioxide and leaves the cell mixed with the chlorine gas. The excess carbonate produces from about 0.2 to 0.6% $CO_2$ by volume in the chlorine depending on the amount of excess carbonate used (see pg. 4, D. Pulver, *The Commercial Use of Membrane Cells in Chlorine/Caustic Plants*, Chlorine Plant Manager's Seminar Proceedings, 21st Meeting, Houston, Texas, February 1978).

Oda, et al (U.S. Pat. No. 4,202,743) when using a carboxylic acid functional membrane and producing between 20 and 45% caustic in the catholyte compartment have reported the concentration of calcium should be less than 0.08 mg/liter (0.066 ppm) and the concentration of magnesium less than 0.04 mg/liter in the cell feed brine.

Dotson (U.S. Pat. No. 3,793,163) reported that the addition of a compound capable of forming, at an elevated pH, an insoluble reversible gel with polyvalent cations was beneficial to the operation of electrolytic cells employing permselective cation-exchange membranes. The additive compounds are selected from the group consisting of free acid and alkali metal phosphates, orthophosphates and metaphosphates. The additives result in current and voltage efficiencies remaining at optimum high levels during extended periods of operation since unsequestered polyvalent cations do not reach the membrane.

It would be advantageous to obtain as good or better results to the solutions of these problems as do the above described methods without having to go to the extremes to which they go in removing, or tying up, the calcium cations. The present invention does just this.

SUMMARY OF THE INVENTION

The present invention centers around the discovery that voltage and power efficiencies of electrolysis cells can be maintained for prolonged periods of time by electrolyzing alkali metal chlorides aqueous solutions which either: (1) have had virtually all "carbon oxide" or "carbonate" removed from the brine prior to its becoming part of the anolyte in an electrolysis cell, or (2) never contained any "carbon oxide" or "carbonate"; or (3) contained some "carbonate" or "carbon oxide" which was virtually all removed as insolubles coupled with a further treatment of the feed solution comprised of removing residual hardness by techniques such as passing the solution through a chelating ion exchange bed, or employing liquid-liquid extraction techniques to the residual hardness, or employing combinations of both the ion exchange technique and the liquid-liquid extraction technique. The operation of these electrolyte cells at higher power effeciencies for longer periods of times is due to their membranes not becoming fouled nearly so quickly with alkaline earth metal carbonate.

The alkali metal of the aqueous alkali metal chloride solution can be either sodium or potassium. Sodium chloride will be the substance discussed hereinafter, but with the understanding that the invention also applies to potassium chloride.

Inasmuch as there is no pure brine (sodium chloride) solutions available in significant commercial quantities, and inasmuch as perfect purity is impossible to achieve, the invention will be described in terms of degrees of purity. For purposes of this invention brine feed, which immediately prior to its becoming part of the anolyte in an electrolytic cell containing a membrane disposed between an anode and cathode to form an anolyte chamber and catholyte chamber, contains more than 100 ppm "carbon oxide" (expressed as ppm $CO_2$) is considered impure. On the other hand brine feed under the same conditions which contains no more than about 70 ppm "carbon oxide" (expressed as ppm $CO_2$) is considered acceptably pure. More preferred brine contains less than about 50 ppm "carbon oxide" (expressed as ppm $CO_2$). Even more preferred brine contains less than about 30 ppm "carbon oxide" (expressed as ppm carbon dioxide), and even more preferred brine contains less than about 10 ppm "carbon oxide". The most preferred brine contains less than about 2 ppm "carbon oxide" (expressed as ppm $CO_2$).

Similar to degrees of purity of the brine with respect to "carbon oxide" are its degrees of purity with respect to hardness (measured as ppm calcium). The membranes cells have been found to perform better when the brine was "pure" with respect to hardness in addition to being pure with respect to "carbon oxide". A brine with hardness of less than about 5 ppm is acceptable; one with a hardness of less than about 3 ppm is preferred; one with a hardness of less than about 1–2 ppm is more preferred; and one with a hardness of less than about 0.2 ppm is even more preferred.

The pH of the brine after it becomes anolyte in combination with the purity of the brine with respect to the "carbon oxide" has also been found to be a significant parameter in the long-term performance of the cell. A pH of less than about 4 is acceptable, while a pH of less than about 3 is preferred, while a pH of about 2.0 is more preferred. The above pH control of the anolyte has been found to cause the cell to perform even better when it is taken in combination with not only the degree of purity of the brine with respect to its "carbon oxide" content, but also in combination with the degree of purity of the brine with respect to its hardness content. Normally this pH control is achieved by adding hydrochloric acid to the brine in sufficient quantities to reach the desired pH prior to or after feeding the brine to the anolyte chamber of the cell.

As stated above this invention contemplates electrolyzing brine to which no sodium carbonate has been added, to which less than an excess of sodium carbonate has been added, and to which a molar excess of sodium carbonate has been added (molar excess with respect to the calcium present in the brine). The latter case occurs in the "conventional" brine treatment defined above, and it is usually the most economical.

After the filtering step of this "conventional" treatment has been accomplished, a mineral acid, preferably hydrochloric, is added to the brine in sufficient quantities to convert virtually all of the "carbon oxide" to carbon dioxide. Removal of this carbon oxide to the levels required by this invention can then be accomplished in several ways. One way is to merely allow the acid treated brine to set until sufficient dissolved and entrained $CO_2$ escapes to the atmosphere to reach the low concentration of $CO_2$ desired in the brine. This is akin to opening a bottle of carbonated cola and letting it set until virtually all the carbon dioxide has left the cola, In both cases this is an extremely slow process, and hence, is not usually suited for industrial use. Speeding up the $CO_2$ removal can be accomplished by agitating the brine. Such agitation can be physical agitation such as shaking or stirring, or it can be other agitation such as bubbling different innocuous gases through the brine. Bubbling chlorine gas and nitrogen gas or air are preferred, but other gases such as argon could also be used.

Further reduction of the residual hardness left after the conventional treatment of brine described above can be accomplished in several ways. One is to pass the conventionally treated brine through a chelating ion exchange bed prior to adding the acid to the brine and removing the carbon dioxide from it. Or instead of using conventional treatment, the hardness could be reduced by known liquid-liquid extraction techniques. Or a combination of both chelating ion exchange bed treatment and a liquid-liquid extraction technique could be used. Other hardness reduction techniques are known to those skilled in the art, and others will readily occur to them when they realize it is unnecessary to remove virtually all the residual hardness (below about 0.08 mg/liter of calcium according to U.S. Pat. No. 4,202,743 to Oda et al) to achieve the same result by removing less hardness in combination with removing the "carbon oxide".

Now, as alluded to above, a similar advantage for long-term membrane cell operation can be achieved by altering the "conventional" brine treatment to a treatment where less than an excess of sodium carbonate is used. When this is done there is no "carbon oxide" or "carbonate" left to remove, for all of the sodium carbonate added has been eliminated by reaction with the hardness in the brine to form insoluble compounds, and, as in conventional brine treatment, there insoluble compounds have then been removed by settling or filtration or both. Hence the remaining brine is left with still too much hardness to be useful in the cell, but yet it is still left with very much less hardness than was present before. This residual hardness can then be reduced to acceptable levels for prolonged membrane cell life by conventional techniques such as contacting the brine with a chelating ion exchange resin bed or by liquid-liquid extraction techniques. In this way there is no "carbonate" to remove after the modified conventional brine treatment has been employed, but in so eliminating its presence the remaining hardness is easily and economically reduced to acceptable levels. These levels, which although are higher levels than the prior art teaches, still produce the same results in terms of long-term membrane cell performance as this prior art teaches, and this is due to the lack of carbonate being present to foul the membrane.

DETAILED DESCRIPTION OF THE INVENTION

It has been discovered that feeding brine containing carbon oxides, particularly carbonate anions or carbon dioxide, to chlor-alkali cells using permselective cation exchange membranes as anolyte and catholyte compartment separators is detrimental to long-term, stable operation of the cells. The detrimental effect caused by the carbonate is seen as a gradual, long term increase in power consumption by the cell. It has been discovered that cells fed brine containing essentially no carbonate (or carbon dioxide), or only low levels (<0.2 gms/liter expressed as sodium carbonate), operate at stable optimum conditions for extended periods of time relative to cells fed brine containing higher levels of carbonate. More surprisingly, it has been discovered that stable cell operation is achieved using low carbonate feed even when brine hardness is as high as 3 ppm (expressed as calcium) or even higher. The combination of low brine hardness (<1.0 ppm) and low carbonate content (<0.1 gms/liter), however, is the preferred brine feed.

The discovery that feeding brine that does not contain, or contains only low levels of, carbonate or carbon dioxide to chlor-alkali cells employing permselective ion-exchange membranes is very beneficial economically. The benefit is realized as long term, stable operation of the cells. It is critical that any chlorine cell operates for periods of months and even years without suffering from an increase in power consumption. Once power consumption has increased the known alternatives are unattractive. Continuing to operate results in increased power cost per unit of product. Disassembling the cells and replacing the membranes results in the cost of lost production, the cost of cell disassembly and assembly, and usually the considerable expense incurred for new membranes. Thus any economical means to extend stable operation of the cells is of considerable benefit.

The discovery of the benefits of feeding low carbonate brine is indeed surprising. It does not appear to matter if the brine feed is alkaline, in which case the carbonate is primarily in the form of sodium or calcium carbonate; or if the feed is acidic, in which case the carbonate has been converted to carbon dioxide. However, unless this carbon dioxide is removed from such acidic brine, then the detrimental effects associated with carbonate will occur.

In dealing with membrane fouling, the prior art on brine purification for membrane cells has dealt with removal or sequestering multivalent cations before they reach the membrane. The novelty of the present work is apparent by the fact that it deals with eliminating an anion, namely $CO_3^{\ominus\ominus}$ or its equivalents, not cations.

Alternatively this invention is concerned with the means by which carbonate in feed brine is avoided or eliminated, in addition to the fact that having only low levels of carbonate in the cell feed reaching the anolyte of the cell is beneficial to achieving long term, low energy operation of the cell.

The present invention is particularly surprising since it would seem that any carbonate or carbon dioxide reaching the anolyte compartment of a chlorine cell would be immediately expelled as $CO_2$ gas with the chlorine gas which is being evolved. Indeed, it would seem that this would be a highly efficient means of removing carbonate upon consideration of the insolubility of carbon dioxide in brine in conjunction with the agitation and sweeping removal action afforded by the escaping chlorine. While the aforesaid is certainly the fate of most of the carbonate or carbon dioxide entering the cell, it has now been found that part of the carbonate reaches the membrane forming insoluble salts thereon and therein, which of course, leads to long term loss of cell performance. Calcium carbonate has actually been identified in membranes from cells that were fed carbonate containing brine. It is not at all certain how the carbonate actually enters the membrane. It can be speculated, without limiting the present invention, that small amounts of carbon dioxide remain in the anolyte solution. The carbon dioxide could then form calcium carbonate in the alkaline regions of the membrane, and form calcium carbonate in a so-called boundary layer extending for a small, but finite distance out from the membrane surface facing the anolyte.

The foregoing, after the fact, speculation is consistent with two things. First, if no hardness, specifically calcium, were present, then carbonate should not be a problem. The data herein show that, when carbonate is constant, a reduction in hardness leads to an improvement in cell performance. Second, increasing the amount of carbonate in brine should not necessarily lead to a further decline in cell performance. Experiments were actually conducted wherein cells were operated on brine containing 0.7 gms/liter of excess carbonate, expressed as sodium carbonate, and compared to cells where additional carbonate, up to 2 to 3 gms/liter, was added to the cell feed. Performance of the latter cells did not decline at a faster rate than the cells with 0.7 gms/liter excess carbonate in the cell feed. Presumably, the additional carbonate was simply swept from the cell as carbon dioxide by the chlorine gas.

It is not critical to the present invention how carbonate or carbon dioxide is eliminated from the brine reaching the anolyte solution of the chlorine cell. Hardness in the brine feed could be completely removed using ion exchange resin beds. This method would not introduce carbonate, but would require a large, expensive increase in resin capacity compared to the combination of conventional treatment and resin beds. Another technique would be to use a solvent extraction process to remove hardness rather than conventional treatment. In this process, the saturated brine is contacted with an organic phase containing a specific extraction agent to remove $Ca^{++}$, $Mg^{++}$ and $Fe^{+++}$. The extracting agent is usually an organic phosphoric acid. Brine purified in this manner typically has hardness levels from about 1 to about 3 ppm. This brine can then be fed directly to the cells or further purified by chelating ion exchange resins. Another technique would be to use conventional brine treatment without adding excess carbonate. Brine having a hardness of from about 8 to 25 ppm could be produced and then further purified by ion exchange resin treatment. A technique that fits well in existing conventional brine treating facilities is to use conventional treatment with the excess carbonate to produce brine having a hardness from about 1 to about 5 ppm. The carbonate can then be removed from this brine and the brined then used directly; or the conventionally treated brine can be further treated with ion exchange resins to further reduce hardness and then the carbonate can be removed.

To achieve optimum low levels of hardness in conventional brine treatment requires from about 0.5 to about 1.5 gms/liter of excess sodium carbonate. Values as low as 0.3 gms/liter are not generally used since brine having in excess of 5 ppm hardness is normally produced. Thus, optimum operation of conventional brine treatment results in levels of carbonate in the treated brine that are shown by the present invention to be highly detrimental to cell operation.

Removal of excess carbonate from conventionally treated brine, regardless of whether additional treatment to further remove hardness has been done, can be accomplished by a variety of techniques. A particularly convenient technique, though not limiting the scope of the present invention, is to acidify the brine with a mineral acid such as hydrochloric acid to convert the carbonate to carbon dioxide. The brine is then degassed to remove the carbon dioxide. It has been found that agitation greatly facilitates removal of the carbon dioxide. Simply acidifying the brine without providing any means for agitation requires in excess of six hours to reduce the carbon dioxide to less than 100 ppm. Agitation coupled with a slow purge of a suitable gas results in having less than 1 ppm $CO_2$ in four hours or less. A suitable gas is one which is substantially inert under the conditions of this purging step, and innocuous under the electrolytic cell conditions. Suitable gases are chlorine, nitrogen, argon and the like.

In many cases, the $CO_2$ can be removed in existing head tanks for the incoming brine by acidifying it in, or before it reaches, these tanks, and then providing agitation and a gas purge by introducing a suitable gas at this point. The chlorine gas produced by the cells can be used for purging with the vent leading directly to the chlorine collection system. This technique does not require any change in existing chlorine purification systems since the majority of the $CO_2$ is expelled from the cell into this system anyway.

Another carbon dioxide removal technique would be to add acidified brine to the cell through the exit port for the chlorine. In this manner the $CO_2$ would not literally be removed before reaching the cell, but would be purged before reaching the anolyte solution of the cell. This is so because the rising chlorine gas produced in the anolyte would act as a gas purge of the acidified brine as this chlorine gas rose through the acidified brine as the acidified brine flowed downward toward the anolyte. In any event the brine must have its carbonate, its carbon dioxide and other carbonate forming materials removed by the time the brine reaches the anolyte. Other carbonate forming materials forming materials besides carbon dioxide are bicarbonate anions and carbonic acid.

As previously pointed out, there are numerous methods to remove carbonate from brine solutions, those discussed above and others. The present invention demonstrates that by whatever means, brine feed to ion exchange membrane chlor-alkali cells should contain only low levels of carbonate, or, if acid brine, contain only low levels of carbon dioxide.

As stated above, there is an increase in the amount of energy consumed per unit of product made associated with long-term use of permselective ion exchange membranes. In order to demonstrate the decrease in this increase achieved by employing this invention, a series of examples and comparative runs are presented below.

EXAMPLE 1

This first example is really a series of ten test runs in which the first six runs are examples of the prior art while the last four are examples of this invention. These ten test runs were ten cells operated over a period of least 300 days, except for the tenth run which was run for only 225 days before the last measurement was made. The first six cells were run on brine treated in various non-inventive ways while the last four were run in two ways involving reducing the "carbon oxide" or "carbonate" to a low value. The striking improvement in energy consumption and cell voltage will be shown in Table I below.

Before discussing these ten cell runs further, however, it will be helpful to define and discuss the parameters involved in considering the energy usage of the cell. One parameter which is important in considering a cell's energy performance is the strength of the caustic produced, for the more concentrated the caustic produced, the less energy will there be later required in evaporating water form the caustic after it has left the cell and is being concentrated. This parameter will not be considered here inasmuch as all ten cells were run at the same caustic concentration.

Thus, laying aside caustic strength as one criteria in the energy performance of cell, the other criteria for obtaining a complete energy view of the overall process, particularly over a long period of time, will not be discussed. One is current efficiency, which is the ability of the membrane to prevent migration of the caustic produced at the cathode into the anode compartment. The second is the voltage at which the cell operates, which is partly determined by the electrical resistance of the membrane. Power efficiency is a parameter often used as one term that considers both the current efficiency and cell voltage. It is defined as the product of the theoretical voltage required divided by the actual voltage required by the cell multiplied by the actual amount of caustic produced divided by the theoretical amount of caustic that could have been produced at a given current. Thus, it is apparent that power efficiency is reduced by higher cell voltage or lower current efficiency. The membrane has a direct effect on both. The most common method of comparing cells is to express the operation as kilowatt hours (KWH) of energy consumed per metric ton (mt) of product produced. This expression also considers both voltage, higher voltage increasing the quantity KWH, and current efficiency, lower efficiency decreasing the quantity of product produced (mt). Thus, the lower the value KWH/mt, the better the performance of the cell.

Now to consider the ten cells used in the ten runs of this experiment and example. A description of the cell used will be given first, then a description of the brine feed for each cell, and then a table (Table I) will be given showing the energy and voltage results for all ten cells.

First, the cells used. The lab cells used for these runs were all alike. They had a flat, verticallyoriented, anode, cathode and membrane. The cathode was made of woven steel wire. The anode was expanded titanium mesh and was coated with a $RuO_2$-$TiO_2$ mixture. The cell was made in two cell halves which were bolted together with the membrane sandwiched between. Each electrode was square and had an area of 27.6 inches.

Cell startup consisted of filling the anolyte compartment with saturated brine (~25% NaCl) and the catholyte compartment with about 12% caustic. The cells were energized by applying a constant current, 27.6 amps to give a current density of 1.0 amps per square inch. Immediately after applying current to the cell, saturated brine was flow controlled through the brine entry port into the anolyte chamber at a rate such that the spent anolyte leaving the cell through the anolyte exit port had a salt concentration of 18-19% NaCl. Deionized water was flow controlled to the catholyte chamber at a rate such the caustic leaving the cell had a concentration of 12% NaOH. The cell temperature was controlled at 80° C. by means of an immersion heater coupled with a thermocouple inserted in the anolyte compartment. Cell voltage was constantly monitored by measuring the potential difference between a stud supporting the anode and a stud supporting the cathode. Current efficiency was determined by collecting the caustic overflow over a several hour period, usually 16 hours, and determining the amount of caustic actually produced compared to the amount theoretically produceable at the applied current.

Before assembling the membrane in the cells, the acid form of the membrane, equilibrated at ambient conditions, was soaked for 30 minutes at 25° C., in a 30% solution of triethanolamine in water. The membrane was removed, air dried, and then installed in the cell.

In the above manner, the following cells were evaluated for performance using Nafion ®324 membrane with the designated brine quality and anolyte pH conditions. Table I shows the results of the cell evaluations. The following list defines the type brine fed to the cell and the method, if any, of controlling the pH of the anolyte in the cell.

Cell 1: Brine was conventionally treated with excess $Na_2CO_3$ and excess NaOH, and then filtered. The $Na_2CO_3$ excess was a molar excess with respect to the calcium present in the brine while the NaOH excess was a molar excess with respect to the magnesium. The excess $Na_2CO_3$ varied from about 0.4 to about 1.0 grams/liter. Hardness varied between 2-3 ppm (expressed as ppm Ca) during the experiment. No acid was added to the anolyte compartment for pH control.

Cell 2: Duplicate of Cell 1.

Cell 3: Same brine treatment as Cell 1 plus the brine was passed through a bed of chelating resin (DOWEX-®A-1) to reduce the hardness to <0.2 ppm Ca.

Cell 4: Duplicate of Cell 3.

Cell 5: Same as Cell 1 with anolyte pH controlled at 2 by HCl addition to cell anode compartment. No agitation or gas purge was used to facilitate removal of carbon dioxide from brine.

Cell 6: Same as Cells 3 and 4 with anolyte controlled at pH of about 2. No agitation or gas purge was used to facilitate removal of carbon dioxide from brine.

Cell 7: Same as Cell 6 with carbonate removed from brine to below less than 2.0 ppm "carbon oxide" (expressed as ppm $CO_2$) by acidifying brine feed, and then purging this brine feed with nitrogen before feeding to cell.

Cell 8: Duplicate of Cell 7.

Cell 9: Same as Cell 5 with carbonate removed from brine by acidifying and purging with nitrogen until brine contained less than 2.0 ppm "carbon oxide" (expressed as ppm $CO_2$) before feeding to cell. Note there was no further reduction of hardness by passing brine through a chelating resin bed as was done in Cells 7 & 8.

Cell 10: Duplicate of Cell 9.

TABLE I

| Cell | Type Brine[1] | Anolyte pH | Voltage Increase[2] After | | | Energy Increase[4] After | | |
|---|---|---|---|---|---|---|---|---|
| | | | 120 DOL[3], | 200, | 300 DOL | 120 DOL, | 200, | 300 DOL |
| 1 | A | 4.2–4.5 | 60 | 140 | 480 | 70 | 90 | 340 |
| 2 | A | 4.2–4.5 | 60 | 130 | 550 | 50 | 60 | 350 |
| 3 | B | 4.2–4.5 | 90 | 110 | 200 | 50 | 70 | 190 |
| 4 | B | 4.2–4.5 | 30 | 70 | 100 | 60 | 50 | 80 |
| 5 | A | 1.9–2.1 | 90 | 150 | 340 | 40 | 140 | 250 |
| 6 | B | 1.9–2.1 | 60 | 60 | 80 | 0 | 30 | 50 |
| 7 | C | 1.5–3.0 | 0 | 0 | 30 | 0 | 0 | 10 |
| 8 | C | 1.5–3.0 | 0 | 0 | 30 | 0 | 0 | 10 |
| 9 | D | 1.5–3.0 | 0 | 0 | 70 | 0 | 0 | 30 |
| 10 | D | 1.5–3.0 | 0 | 0 | 40[5] | 0 | 0 | 50[5] |

[1]A. Conventionally treated, hardness 2–3 ppm Ca.
B. Conventionally treated plus chelating resin treatment; hardness 0.1 to 0.2 ppm Ca
C. Same as B with "carbon oxides" removed before cell entry.
D. Same as A with "carbon oxides" removed before cell entry.
[2]Measured in millivolt increase over original cell voltage
[3]DOL means days on line
[4]KWH/mt NaOH - The most common method of comparing cells is to express the operation as kilowatt-hours (KWH) of energy consumed per metric ton (mt) of product produced. This expression considers both voltage, higher voltage increasing the quantity KWH, and current efficiency, lower efficiency decreasing the quantity of product produced, here metric ton of NaOH. Thus, the lower the energy value KWH/mt, the better the performance of the cell.
[5]Cell 10 was run only 225 DOL, instead of 300 DOL.

Table I is a data tabulation for the ten ion transfer membrane chlor-alkali cells of this experiment which were operated over a period of 300 (Cell 10 was operated only 225 days). The operation of Cells 7, 8, 9, 10 serve as Example 1 of this invention. All of the cells were operated by starting with conventionally treated brine containing 2 to 3 ppm hardness expressed as calcium and containing 0.7 to about 1.0 gms/liter of excess sodium carbonate. Cells 1 and 2 were fed this brine directly. The conventionally treated brine was passed through a chelating ion exchange resin bed to further reduce hardness to 0.1 to 0.2 ppm. Cells 3 and 4 were fed this brine. Cell 5 was fed brine the same as Cells 1 and 2 except the brine was acidified at the cell entry port to achieve a pH of about 2 in the anolyte of the cell. Cell 6 was fed the same brine as Cells 3 and 4 except for acidification to get a pH of about 2 in the anolyte. No agitation or gas purge was used to facilitate $CO_2$ evolution from the cell feed of Cells 5 and 6. Any reduction in $CO_2$ was simply attributable to rapid degassing immediately on acidification. Cells 7, 8, 9 and 10 were all fed brine that contained less than 2.0 ppm $CO_2$. The brine was acidified in a tank and purged with nitrogen before feeding to the cells. Cells 7 and 8 were fed low hardness ion exchange treated brine and Cells 9 and 10 were fed conventionally treated brine. All of these cells contained a sulfonic acid functional membrane sold as Nafion ®324 by E. I. duPont Company. The cell operation data is reported as cell voltage gain with time and as the energy increase per unit of product gain with time which considers both voltage and current efficiency.

Cell voltage generally fluctuates up or down by about 10 to 20 mv and errors in measurement plus voltage fluctuations can cause an error in energy measurements of as much as 10 KWH/mt. It is believed that anode problems caused the measurements for Cell 3 to be somewhat high and that Cell 4 better represents operation of cells at the conditions of Cells 3 and 4. Comparing Cells 1 and 2 with Cell 5 and Cells 3 and 4 with Cell 6 shows a somewhat improved operation from using a lower anolyte pH. This could well be due to a small reduction in carbonate. Comparing Cells 1 and 2 to Cells 3 and 4 and Cell 5 to Cell 6 show the benefit from reducing hardness in the brine feed. This effect becomes far more pronounced at extended times.

Comparing Cell 6 and Cell 4 to Cells 7 and 8 show the marked long term benefit from removing the carbonate. As a matter of fact, Cell 7, after 450 days in operation showed a net decrease in energy consumption of 10 KWH/mt. Cells 9 and 10 compared to Cells 1, 2, and 5 show the remarkable improvement in cell performance achieved at the higher hardness levels by removing carbonate from the feed solution. It is evident that the cells are far more tolerant to high hardness levels in the absence of carbonate or carbon dioxide.

EXAMPLE 2

The experimental procedure used was the same as Example 1 except a membrane similar to Nafion ®324 was used which had the 1 mil, 1500 eg. wt. layer facing the catholyte replaced with a 0.50 mil, 1600 eq. wt. layer. The brine feed was resin treated to a hardness of 0.1 to 0.2 ppm Ca and contained from about 4 to about 6 ppm carbon dioxide. The brine was then acidified by adding concentrated HCl solution in sufficient quantities to arrive at 0.57 wt. % HCl in the brine. This brine was continuously agitated by pumping from open tank to open tank and within a tank for period of from, about 3 days to about 6 days. This brine then only contained from about 4 ppm to about 6 ppm carbon dioxide. The cell was operated with its anolyte at a pH of from about 0.4 to about 0.6. The initial cell voltage was 3.26 and the initial energy consumption was 2360 KWH/mt. After 120 days, the voltage was only 3.24 volts, and the energy consumption was only 2370 KWH/mt. After 300 days, the voltage was only 3.23 volts, and the energy consumption was only 2360 KWH/mt.

EXAMPLE 3

The experiment was conducted in the same type cell as Example 1, and a similar procedure was used with the following changes. A current of 55.2 amps was applied to the cell to give a current density of 2.0 amps per square inch. The membrane was a fluoropolymer having carboxylic acid functional groups and was pretreated by soaking in ambient water. Water was flow controlled to the cell at a rate such that 30 to 32% caustic left the cell. The brine feed to the cell contained 0.1 to 0.3 ppm Ca and less than 2 ppm "carbon oxide"

(expressed as ppm $CO_2$). This quality of brine was achieved by the same procedure as used in treating the brine feed of Cells 7 and 8 of Example 1. The anolyte pH was maintained at 2.5 to 3.0 by controlling the acidified feed brine flowrate to the cell. The initial voltage was 3.63 and the initial energy consumption was 2630 KWH/mt. After 100 days operation, the voltage was only 3.55 volts, and the energy consumption was only 2580 KWH/mt. After 200 days operation, the voltage was 3.61 volts and the energy consumption was only 2610 KWH/mt.

What is claimed is:

1. A process for producing chlorine and an alkali metal hydroxide solution in an electrolytic cell containing a permselective cation exchange membrane disposed between an anode and a cathode to form an anolyte compartment and a catholyte compartment, said process comprising:

electrolyzing an alkali metal chlorine solution in said electrolytic cell with said alkali metal solution containing carbonate anions and carbon dioxide in such low concentrations so that the sum of their concentrations is no greater than about 70 ppm (expressed as parts per million carbon dioxide) at the moment before said solution becomes a part of the anolyte in the anolyte compartment in order that said permselective membrane in said cell will maintain a longer usefulness in producing chlorine and alkali metal hydroxide at low electrical energy consumption per unit of product produced.

2. In a continuous process for producing chlorine and an alkali metal hydroxide by electrolysis of an impure alkali metal chloride aqueous solution substantially continuously fed into an anolyte chamber of an electrolytic cell containing a permselective ion exchange membrane disposed between an anode and a cathode so as to form the anolyte chamber and a catholyte chamber, the improvement which comprises:

electrolyzing an alkali metal chloride solution in the cell which solution, immediately prior to being fed into the anolyte chamber and becoming a part of the anolyte, contains no more than about 70 ppm "carbon oxide" (expressed as ppm $CO_2$) so that the long term use of electrical power consumed per unit of product made by the cell is diminished and the membrane's useful long-term life is extended.

3. The process of claim 2 wherein the impure alkali metal chloride aqueous solution which is electrolyzed is sodium chloride brine.

4. The process of claim 2 wherein the alkali metal chloride aqueous solution electrolyzed is an aqueous solution of potassium chloride brine.

5. The process of claims 2, 3 or 4 wherein the alkali metal chloride solution electrolyzed contains no more than about 50 ppm "carbon oxide", expressed as ppm $CO_2$.

6. The process of claims 2, 3 or 4 wherein the alkali metal chloride solution electrolyzed contains no more than about 30 ppm "carbon oxide", expressed as ppm $CO_2$.

7. The process of claim 2, 3 or 4 wherein the alkali metal chloride solution contains no more than about 10 ppm "carbon oxide", expressed as ppm $CO_2$.

8. The process of claim 2, 3 or 4 wherein the brine feed contains less than about 10 ppm carbon oxide (expressed as ppm $CO_2$), immediately prior to its becoming anolyte and wherein the anolyte is maintained at a pH of less than about 3.0 during electrolysis.

9. The process of claim 2, 3 or 4 wherein the cell feed solution contains less than about 10 ppm carbon oxide (expressed as ppm $CO_2$) and a hardness level of less than about 5 ppm (expressed as ppm calcium) immediately prior to its becoming anolyte and wherein the anolyte is maintained at a pH of less than about 3.0 during electrolysis.

10. The process of claim 2, 3 or 4 wherein the solution fed to the anolyte compartment contains less than about 10 ppm "carbon oxide" (expressed as ppm $CO_2$) and a hardness level of less than about 1.0 ppm (expressed as ppm calcium), and wherein the pH of the anolyte is maintained at about 2 during the electrolysis step.

11. In a process of producing chlorine and an alkali metal hydroxide by feeding an impure aqueous solution of an alkali metal chloride solution to the anolyte compartment of an electrolytic cell containing a permselective cation exchange membrane disposed between an anode and a cathode to form a catholyte compartment and said anolyte compartment wherein said solution is electrolyzed, the improvement which comprises:

feeding an aqueous solution of an alkali metal chloride solution to the anolyte compartment which contains no more than about 70 ppm "carbon oxide" (expressed as ppm $CO_2$) immediately prior to said solution becoming part of the anolyte; and then electrolyzing said solution.

12. In a process for the production of chlorine anc caustic soda by feeding a treated sodium chloride brine solution to the anolyte chamber of an electrolytic cell and water to its catholyte chamber and then performing electrolysis upon said brine, said chambers being formed by having a permselective ion exchange membrane disposed in said cell between an anode and a cathode, said brine having been at least treated by the addition of at least some sodium carbonate and at least some sodium hydroxide to it to form insoluble compounds of some of the hardness in it and then treating said brine by separating most of the insolubles from it before feeding it to the anolyte chamber, the improvement which comprises:

feeding a treated brine solution to the anolyte chamber which contains no more than about 70 ppm "carbon oxide" (expressed as ppm $CO_2$) at least at the moment before it is fed into the anolyte chamber so that said membrane will suffer less alkaline earth metal carbonate fouling and said cell will consume less electrical energy per unit of product produced over the life of the membrane.

13. The process of claim 12 wherein the treated brine contains less than about 50 ppm "carbon oxide".

14. The process of claim 12 wherein the treated brine contains less than about 30 ppm "carbon oxide".

15. The process of claim 12 wherein the treated brine contains less than about 10 ppm "carbon oxide".

16. The process of claim 12 wherein the treated brine contains less than about 5 ppm hardness (expressed as ppm calcium).

17. The process of claim 13 wherein the treated brine contains less than about 5 ppm hardness (expressed as ppm calcium).

18. The process of claim 14 wherein the treated brine contains less than about 5 ppm hardness (expressed as ppm calcium).

19. The process of claim 15 wherein the treated brine contains less than about 5 ppm hardness (expressed as ppm calcium).

20. The process of claim 12 wherein the treated brine contains less than about 3 ppm hardness (expressed as ppm calcium).

21. The process of claim 13 wherein the treated brine contains less than about 3 ppm hardness (expressed as ppm calcium).

22. The process of claim 14 wherein the treated brine contains less than about 3 ppm hardness (expressed as ppm calcium).

23. The process of claim 15 wherein the treated brine contains less than about 3 ppm hardness (expressed as ppm calcium).

24. The process of claim 12 wherein the treated brine contains less than about 1 to 2 ppm hardness (expressed as ppm calcium).

25. The process of claim 13 wherein the treated brine contains less than about 1 to 2 ppm hardness (expressed as ppm calcium).

26. The process of claim 14 wherein the treated brine contains less than about 1 to 2 ppm hardness (expressed as ppm calcium).

27. The process of claim 15 wherein the treated brine contains less than about 1 to 2 ppm hardness (expressed as ppm calcium).

28. The process of claim 12 wherein the treated brine contains less than about 0.2 ppm hardness (expressed as ppm calcium).

29. The process of claim 13 wherein the treated brine contains less than about 0.2 ppm hardness (expressed as ppm calcium).

30. The process of claim 14 wherein the treated brine contains less than about 0.2 ppm hardness (expressed as ppm calcium).

31. The process of claim 15 wherein the treated brine contains less than about 0.2 ppm hardness (expressed as ppm calcium).

32. The process of claim 12, 13, 14 or 15 which further comprises maintaining the pH of the anolyte during electrolysis below about 3.0.

33. The process of claim 16, 17, 18, 19, 20, 21, 22, 23, 24, 25, 26, 27, 28, 29, 30 or 31 which further comprises maintaining the pH of the anolyte during electrolysis below about 3.0.

34. The process of claim 12, 13, 14 or 15 which further comprises maintaining the pH of the anolyte at about 2.0 during electrolysis.

35. The process of claim 16, 17, 18, 19, 20, 21, 22, 23, 24, 25, 26, 27, 28, 29, 30 or 31 which further comprises maintaining the pH of the anolyte at about 2.0 during electrolysis.

36. In a process for preparing sodium chloride brine for electrolysis and then electrolyzing said brine in order to produce chlorine and caustic soda in a electrolytic cell which contains a permselective ion exchange membrane disposed between an anode and a cathode to form an anolyte compartment and a catholyte compartment, said brine preparation including adding a sufficient excess of sodium carbonate and sodium hydroxide to cause the precipitation of, and to allow the removal of, the hardness content of the brine down to a point where only a residual hardness concentration no greater than about 5 ppm (expressed as ppm calcium) remains in the thus treated brine, and wherein the thus treated brine contains the contaminant Z (wherein Z is carbon dioxide, or carbonic acid, or a carbonate or bicarbonate of an alkali metal or alkaline earth metal (including magnesium) or a combination thereof), and wherein in said thus treated brine, the concentration of Z is greater than about 100 ppm (expressed as ppm $CO_2$), the improvement in said process comprising:

A. adding sufficient acid to the impure brine to react with all of the carbonate anions and bicarbonate anions present to convert virtually all of them to carbon dioxide;

B. removing the carbon dioxide which remains dissolved and entrained in said brine until said brine contains a concentration of carbon dioxide which is no greater than 70 ppm at the moment before said brine is fed into the anolyte chamber;

C. feeding this carbon dioxide-free brine into said anolyte chamber; and

D. electrolyzing said carbon dioxide-free brine in said electrolytic cell so that their membranes will not become as quickly fouled with alkaline earth metal carbonate and the cell's electrical power consumption will remain low for a longer period of time.

37. The process of claim 36 wherein the acid added in step (A) is a mineral acid.

38. The process of claim 36 wherein the acid added in step (A) is hydrochloric acid.

39. The process of claim 36 wherein the removal of the carbon dioxide in step (B) comprises agitating the brine.

40. The process of claim 36 wherein the removal of the carbon dioxide in step (B) comprises bubbling another gas through said brine.

41. The process of claim 36 wherein the removal of the carbon dioxide in step (B) comprises bubbling chlorine gas through said brine.

42. The process of claim 36 wherein the removal of the carbon dioxide in step (B) comprises bubbling nitrogen gas through said brine.

43. The process of claim 36 wherein the removal of the carbon dioxide comprises bubbling air through said brine.

44. The process of claim 36, 37, 38, 39, 40, 41, 42 or 43 wherein step (B) the removal of carbon dioxide from said brine is continued until its concentration in said brine is no greater than about 50 parts per million.

45. The process of claims 36, 37, 38, 39, 40, 41, 42 or 43 wherein the removal of said carbon dioxide continues until its concentration in said brine is no greater than 25 ppm.

46. The process of claims 36, 37, 38, 39, 40, 41, 42 or 43 which further comprises reducing the level of the hardness remaining in the brine to a concentration below about 10 ppm (expressed as ppm calcium).

47. The process of claims 36, 37, 38, 39, 40, 41, 42 or 43 which further comprises reducing the level of the hardness remaining in the brine to a concentration below about 1.0 ppm (expressed as ppm calcium).

48. The process of claims 36, 37, 38, 39, 40, 41, 42 or 43 which further comprises reducing the level of the hardness remaining in said brine to a concentration below about 1 ppm (expressed as ppm calcium or calcium carbonate); and wherein in step (B) the removal of carbon dioxide from the brine is continued until its concentration is no greater than about 50 ppm in said brine.

49. The process of claims 36, 37, 38, 39, 40, 41, 42 or 43 which further comprises reducing the level of hardness remaining in the brine to a concentration below about 1 ppm (expressed as calcium); and wherein in step (B) the removal of carbon dioxide from the brine continues until its concentration is no greater than about 25 ppm in said brine.

50. The process of claims 36, 37, 38, 39, 40, 41, 42 or 43 which further comprises reducing the level of hardness in the brine to a concentration below about 3 ppm (expressed as calcium); and wherein in step (B) the removal of carbon dioxide from the brine continues until it is no greater than 50 ppm in said brine; and which process further comprises maintaining the pH of the anolyte in the anolyte compartment below about 4.0 pH during the electrolysis of step (D).

51. The process of claims 36, 37, 38, 39, 40, 41, 42 or 43 which further comprises reducing the level of the hardness remaining in said brine to a concentration below about 3.0 ppm (expressed as ppm calcium) in said brine by passing said brine through a chelating ionexchange resin bed; and wherein in step (B) the removal of carbon dioxide from the brine is continued until its concentration in the brine is no greater than about 25 ppm; and which process further comprises maintaining the pH of the anolyte in the anolyte compartment below about 4.0 during the electrolysis of step (D).

52. In the process of preparing sodium chloride brine for electrolysis, and actually electrolyzing it, in an electrolysis cell containing a permselective ion exchange membrane disposed between an anode and a cathode to form an anolyte chamber and a catholyte chamber, wherein the brine fed to the anolyte chamber for electrolysis has been treated to substantially reduce its hardness prior to feeding it to said cell, the improvement which comprises:
   A. Not treating the brine with alkali metal carbonate;
   B. Removing the hardness by methods other than treating the brine with alkali metal carbonate; and
   C. Electrolyzing brine which contains no more than about 70 ppm "carbon oxide" (expressed as ppm $CO_2$) as measured just before the brine becomes part of the anolyte in order to maintain the operation of the cell at a high electrical power efficiency for a longer period of time by not fouling the membrane so quickly with alkaline earth metal carbonate.

53. The method of claim 52 wherein the hardness is removed by contacting the brine with at least one chelating ion exchange resin bed.

54. The method of claim 52 wherein the hardness content is removed in step (B) by a solvent extraction process.

55. In a process for preparing hardness containing brine for electrolysis in an electrolytic cell containing a permselective ion exchange membrane disposed between an anode and a cathode and then electrolyzing the brine in the cell, the improvement which comprises:
   A. Adding less than a molar excess of sodium carbonate (molar with respect to the calcium present) to cause the formation of insoluble compounds by the calcium cations in an amount which is less than would be achieved by adding the conventional molar excess of $Na_2CO_3$;
   B. Removing the residual calcium retained in the brine by other methods than adding sodium carbonate; and
   C. Electrolyzing brine which contains no more than about 70 ppm "carbon oxide" (expressed as ppm carbon dioxide) as measured just before the brine becomes part of the anolyte in order to maintain the operation of the cell at a high electrical power effeciency for a longer period of time by reducing the fouling of the membrane with alkaline earth metal carbonate.

56. The process of claim 55 wherein the removal of residual calcium in step (B) comprises removing said residual calcium by contacting said brine with a chelating ion exchange resin bed.

57. The process of claim 55 wherein the removal of residual calcuim carried out in step (B) comprises employing a solvent extraction technique.

* * * * *